(12) United States Patent
Matsumoto (10) Patent No.: US 9,438,873 B2
(45) Date of Patent: Sep. 6, 2016

(54) PROJECTOR

(71) Applicant: Seiko Epson Corporation, Tokyo (JP)

(72) Inventor: Morio Matsumoto, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/709,736

(22) Filed: May 12, 2015

(65) Prior Publication Data

US 2015/0334337 A1 Nov. 19, 2015

(30) Foreign Application Priority Data

May 14, 2014 (JP) .................................. 2014-100229

(51) Int. Cl.
| | |
|---|---|
| H04N 9/31 | (2006.01) |
| H04N 5/445 | (2011.01) |
| G03B 21/14 | (2006.01) |
| H04N 21/485 | (2011.01) |

(52) U.S. Cl.
CPC .......... *H04N 9/3194* (2013.01); *G03B 21/142* (2013.01); *H04N 5/44543* (2013.01); *H04N 9/31* (2013.01); *H04N 9/3179* (2013.01); *H04N 21/485* (2013.01)

(58) Field of Classification Search
None
See application file for complete search history.

(56) References Cited

U.S. PATENT DOCUMENTS

2011/0170021 A1* 7/2011 Ozawa .................. G03B 21/26
348/744

FOREIGN PATENT DOCUMENTS

| JP | 2005-72887 A | 3/2005 |
|---|---|---|
| JP | 2013-239835 A | 11/2013 |

* cited by examiner

*Primary Examiner* — Michael Teitelbaum
(74) *Attorney, Agent, or Firm* — ALG Intellectual Property, LLC (57) ABSTRACT

A projector includes an OSD image generation section that generates an OSD image, an OSD processor that generates a combined image in which the OSD image is superimposed on an input image, a light source section that outputs a light flux, a light modulator that modulates the light flux in accordance with the combined image to produce image light, a projection system that projects the image light, and a placement detector that detects whether an additional lens that changes the ratio between values in intersecting two direction in the image light has been inserted into the optical path of the projection system, and when the placement detector detects that the additional lens has been inserted, the OSD image generation section generates the OSD image in accordance with the inserted additional lens.

7 Claims, 5 Drawing Sheets

PROJECTOR

The entire disclosure of Japanese Patent Application No. 2014-100229, filed May 14, 2014 is expressly incorporated by reference herein.

BACKGROUND

1. Technical Field

The present invention relates to a projector.

2. Related Art

In a projector that projects and displays input video images on a screen, there is a known technology that allows an anamorphic system to be added to a projection system to change the aspect ratio of the displayed input video images (see JP-A-2013-239835 and JP-A-2005-72887, for example). The projector described in JP-A-2013-239835 includes a mechanism that is operated by a user and moves the anamorphic system into the optical path of the projection system. The projector described in JP-A-2005-72887 has a function of correcting, based on the optical characteristic of the anamorphic system added to the projection system, an area where the input video images are projected.

A recent projector has an on-screen display (hereinafter referred to as "OSD") function that allows a user, when the user desires to perform a variety of functional settings during image display, to operate the projector to invoke a menu screen for the functional settings and issue a setting instruction with the menu screen superimposed on the image.

In a configuration in which an anamorphic system is added to a projector having the OSD function activated to change the aspect ratio of a projected image, however, the menu screen and other objects displayed by the OSD function are also deformed at a predetermined aspect ratio, which means that the displayed menu screen is expanded or narrowed in a fixed direction, resulting in a problem of degradation in visibility of character information on the menu screen.

SUMMARY

An advantage of some aspects of the invention is to change the aspect ratio of a projected image without degradation in visibility of a menu screen and other objects displayed by the OSD function.

The invention can be implemented in the following aspects or application examples.

Application Example 1

A projector according to this application example includes a generation section that generates an OSD image, a combining section that generates a combined image in which the OSD image is superimposed on an input image, a light source section that outputs a light flux, a modulation section that modulates the light flux in accordance with the combined image to produce image light, a projection section that projects the image light, and a detection section that detects whether an optical member that changes a ratio between values in intersecting two direction in the image light has been inserted into an optical path of the projection section, and when the detection section detects that the optical member has been inserted, the generation section generates the OSD image in accordance with the optical member inserted into the optical path.

The configuration described above allows not only detection of insertion of the optical member, which changes the ratio between values in two intersecting directions in the image light, into the optical path of the projection section but also generation of an OSD image in accordance with the inserted optical member, whereby degradation in visibility of the OSD image that occurs when the optical member changes the ratio in the image light can be avoided.

Application Example 2

It is preferable that the projector according to the application example described above further includes a storage section that stores OSD data on the OSD image, and the generation section preferably generates the OSD image based on the OSD data stored in the storage section.

According to the configuration described above, storing OSD data in the storage section allows quick generation of an OSD image.

Application Example 3

In the projector according to the application example described above, it is preferable that when the detection section does not detect the insertion of the optical member, the generation section generates a first OSD image, whereas when the detection section detects the insertion of the optical member, the generation section deforms the first OSD image in accordance with an optical characteristic of the optical member to generate a second OSD image.

According to the configuration described above, when the optical member is not inserted, the first OSD image is generated, whereas when the optical member is inserted, the second OSD image is generated by deforming the first OSD image in accordance with an optical characteristic of the optical member, whereby an appropriate OSD image according to the optical characteristic of the optical member can be generated.

Application Example 4

In the projector according to the application example described above, it is preferable that the generation section generates the second OSD image by expanding or reducing the first OSD image in a predetermined direction.

Application Example 5

In the projector according to the application example described above, it is preferable that the optical member is inserted into a portion on one side of the projection section on which the image light is incident, into a portion on the other side of the projection section where the image light exits, or into the projection section.

Application Example 6

In the projector according to the application example described above, it is preferable that the optical member is an anamorphic lens, and that the generation section generates the second OSD image by reducing the first OSD image in a direction in which the image light is expanded by the anamorphic lens.

According to the configuration described above, the second OSD image is generated by reducing the first OSD image in the direction in which the image light is expanded by the anamorphic lens, whereby a situation in which an OSD image expanded by the anamorphic lens occupies a large part of a projection area can be avoided.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.

Embodiment

Figure 1:
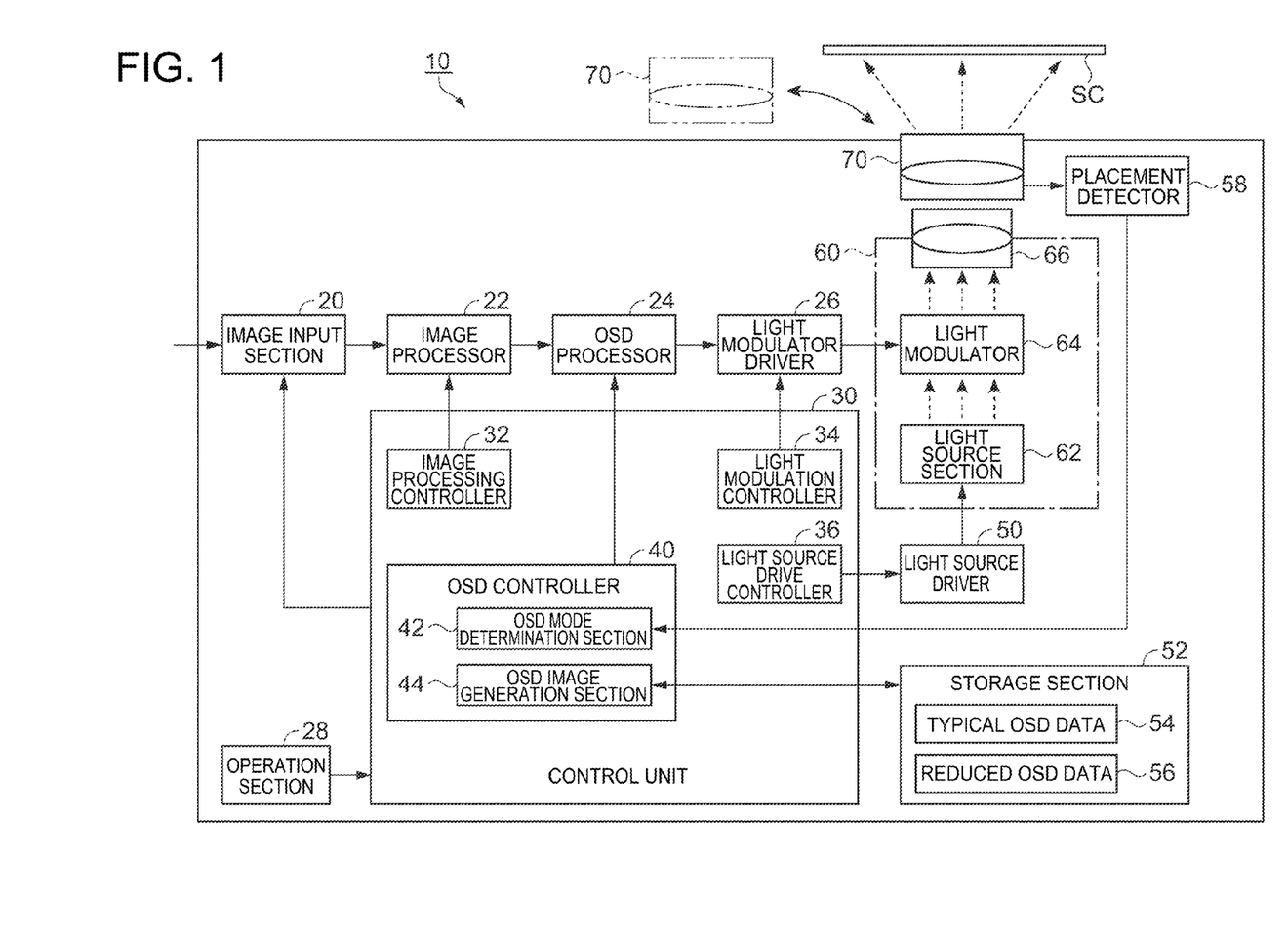
FIG. 1 is a block diagram showing a functional configuration of a projector according to an embodiment of the invention.

FIG. 1 is a block diagram showing a functional configuration of a projector 10 according to the present embodiment. The projector 10 has a function of producing image light based on input image data and projecting the produced image light on a screen SC to display a projected image on the screen SC.

The projector 10 includes a projection unit 60, which forms an optical image, and an image processing system that electrically processes an image signal to be inputted to the projection unit 60. In the present embodiment, the image processing system is assumed to include an image input section 20, an image processor 22, an OSD processor 24, a light modulator driver 26, and a light source driver 50.

The projector 10 further includes a storage section 52, a control unit 30, and an operation section 28. The storage section 52 is assumed to be a ROM, a flash memory and the like that are not shown and stores a control program for driving the functional sections, a user interface image in the form of a menu invoked by a user, and OSD data (typical OSD data 54 and reduced OSD data 56) for generating OSD images including a warning message of which the user is notified and other types of information.

The control unit 30 is assumed to be a CPU, a RAM, and other portions that are not shown, includes an image processing controller 32, a light modulation controller 34, a light source drive controller 36, and an OSD controller 40, and reads and executes the control program stored in the storage section 52 to control the function of each of the functional sections. The OSD controller 40 includes an OSD mode determination section 42 and an OSD image generation section 44.

The operation section 28 is assumed to be operation buttons (not shown) arranged on the projector 10 and a remote control (not shown) that wirelessly transmits an operation signal, and the operation section 28 accepts user's operation instruction.

The projection unit 60 includes a light source section 62, a light modulator 64, and a projection system 66 and forms an optical image.

The light source section 62 includes a light source, such as a xenon lamp, an ultrahigh-pressure mercury lamp, an LED (light emitting diode), and a laser light source. The light source section 62 may further include a reflector and an auxiliary reflector that guide light emitted from the light source to the light modulator 64, a light control element that is located in the path to the light modulator 64 and attenuates the light from the light source, and other components (neither of them is shown). The light source driver 50 is connected to the light source section 62. The light source driver 50 controls electric power supply to the light source section 62 to turn on and off the light source in the light source section 62 under the control of the light source drive controller 36.

The light modulator 64 receives a signal from the image processing system, which will be described later, and modulates a light flux outputted from the light source section to produce image light. The light modulator 64 is specifically configured based, for example, on a method using three transmissive or reflective liquid crystal panels (not shown) corresponding to three colors of RGB. In this case, the light outputted from the light source section 62 is separated into R, G, and B color light fluxes with the aid, for example, of dichroic mirrors and incident on the light modulator 64, and the liquid crystal panels for the respective colors provided in the light modulator 64 modulate the color light fluxes. The color light fluxes are then combined with one another by a cross dichroic prism, and the combined light is guided to the projection system 66. In the present embodiment, it is assumed that the light modulator 64 includes transmissive liquid crystal panels. The light modulator 64 is so driven by the light modulator driver 26 that the light transmittance at each of pixels arranged in a matrix is changed. The image light is thus generated. The light modulator 64 is not necessarily based on a method using liquid crystal panels, and it is conceivable to employ a DLP method, an LCOS method, or any other method. The light modulator 64 corresponds to a modulation section.

The projection system 66 has a function of optically enlarging the modulated image light from the light modulator 64 and projecting the enlarged image light on the screen SC. The projection system 66 is specifically formed of a lens group formed of a plurality of lenses. Adjusting the positions of the lenses allow focus adjustment in which a projected image on the screen SC is brought into focus and zoom adjustment in which the degree of expansion and reduction of the projected image is adjusted.

Further, the projection system 66 includes a mechanism for removably placing an additional lens 70, which is an optical member. The additional lens 70 is a lens for converting an aspect ratio representing the ratio between values in two directions that intersect each other, such as the vertical direction and the horizontal direction of an image, to change the angle of view. In the present embodiment, the additional lens 70 is assumed to have, but not necessarily, a configuration in which the additional lens 70 is placed on one side of the projection system 66 or the side thereof where the image light exits so that the additional lens 70 is inserted into the optical path of the projection system. For example, the additional lens 70 may instead be assumed to have a configuration in which the additional lens 70 is placed on the other side of the projection system 66 or the side thereof where the image light is incident or a configuration in which the additional lens 70 is disposed in the projection system 66, that is, between lenses that form the projection system 66. The projection system 66 corresponds to a projection section.

The additional lens 70 is further assumed to be, but not necessarily, an anamorphic lens that expands the angle of view corresponding to an image having an aspect ratio of 16:9 to the angle of view corresponding to a cinemas cope sized image having an aspect ratio of 2.35:1. The additional lens 70 may instead be assumed, for example, to be an axially non-symmetric lens, such as a toric lens and a cylindrical lens having orthogonal light collection characteristics in two directions, or a fish-eye lens that projects image light on a hemispheric projection surface.

A placement detector 58 detects whether the additional lens 70 has been placed in the projection system 66 and sends a placement signal representing the placement to the OSD mode determination section 42. In the present embodiment, the placement detector 58 is assumed to have, but not necessarily, a configuration in which a press switch, a photoelectric switch, or any other switch is used to detect placement and removal of the additional lens 70. For example, when the projector 10 includes a CCD camera for capturing a projected image, the size and other factors of the projected image captured with the CCD camera may be analyzed, and a result of the analysis may be used to determine whether the additional lens 70 has been placed. The placement detector 58 corresponds to a detection section.

The image processing system of the projector 10 will next be described.

The image input section 20 accepts image data on an input image, such as a content image, from a personal computer, a variety of image players, and other external image supply apparatus and a flash memory and other memory cards that are not shown. The image data may be data on moving images (video images) or data on still images.

In the present embodiment, the image input section 20 is assumed, for example, to be a DVI (digital visual interface), a USB interface, and a LAN interface, to which a digital video signal is inputted, or an interface having an HDMI (registered trademark) connector or any other component that complies with the HDMI standard or a connector or any other component that complies with the DisplayPort (trademark) standard established by VESA (Video Electronics Standards Association). The image data accepted by the image input section 20 undergoes scaling as required and is then sent to the image processor 22.

The image processor 22 acquires the image data outputted from the image input section 20, identifies the image size and resolution of the image data, evaluates whether the image data is formed of still images or moving images, and identifies the frame rate and other attributes of the image data when it is formed of moving images under the control of the image processing controller 32. The image processor 22 then loads the images on a frame basis into a frame memory (not shown). The image processor 22 further performs resolution conversion when the resolution of the acquired image data differs from display resolution of the liquid crystal panels in the light modulator 64, performs expansion/reduction when an zooming instruction is issued from the operation section 28, and loads the processed images into the frame memory. The image processor 22 then outputs the image data having been loaded on a frame basis into the frame memory to the OSD processor 24.

The OSD processor 24, when the OSD controller 40 determines to perform OSD display, generates combined image data representing a combined image that is a combination of an OSD image generated by the OSD image generation section 44 and each of the images on a frame basis and outputs the generated combined image data in the form of an image signal to the light modulator driver 26. On the other hand, when the OSD controller 40 determines to perform no OSD display, the OSD processor 24 outputs the imaged data on a frame basis in the form of an image signal to the light modulator driver 26. The OSD controller 40 determines, based on an OSD display instruction from the operation section 28, whether an OSD screen is displayed. The OSD processor 24 corresponds to a combining section.

The OSD mode determination section 42 determines, based on the placement signal sent from the placement detector 58, a display mode in accordance with which OSD display is performed. In the present embodiment, the OSD mode determination section 42, when it accepts the placement signal representing that the additional lens 70 has been placed, determines to use an expanded projection mode. On the other hand, the OSD mode determination section 42, when it accepts no placement signal representing that the additional lens 70 has been placed, determines to use a typical projection mode. The OSD mode determination section 42 notifies the OSD image generation section 44 of the determined projection mode.

The OSD image generation section 44 generates an OSD image in accordance with the projection mode notified from the OSD mode determination section 42. In the present embodiment, when the projection mode is the typical projection mode, the OSD image generation section 44 generates a typical OSD image 105A (FIG. 2), which corresponds to a first OSD image, based on the typical OSD data 54 stored in the storage section 52 in advance. When the projection mode is the expanded projection mode, the OSD image generation section 44 generates a reduced OSD image 105B (FIG. 3), which corresponds to a second OSD image, based on the reduced OSD data 56 stored in the storage section 52 in advance. Either of the OSD images generated by the OSD image generation section 44 is sent to the OSD processor 24. The OSD image generation section 44 corresponds to a generation section.

The light modulator driver 26 is driven under the control of the light modulation controller 34 and drives the light modulator 64 based on the image signal on a frame basis from the OSD processor 24 to produce image light.

Figure 2:
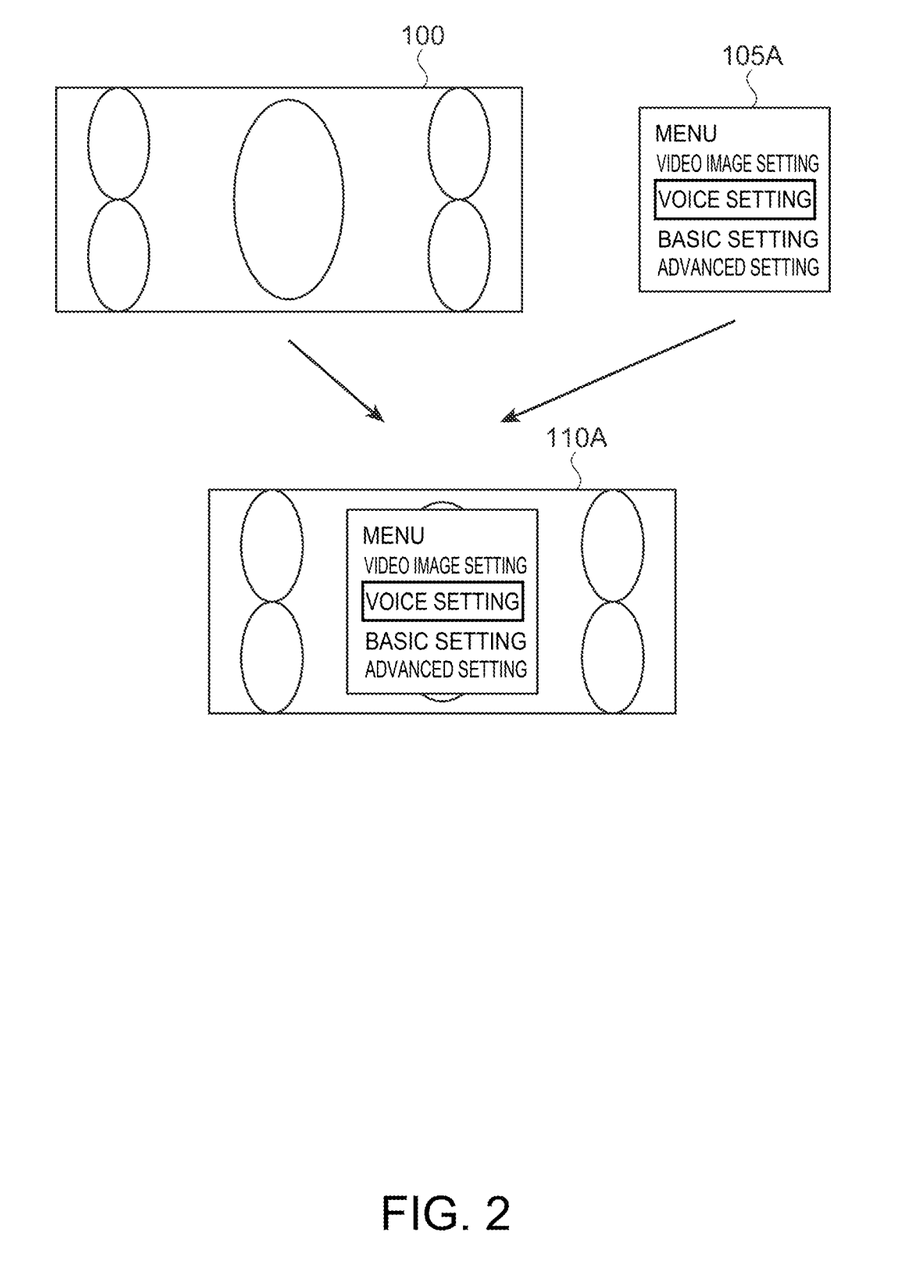
FIG. 2 shows an OSD image combining method in a case where no additional lens is placed in a projection system.

FIG. 2 shows an OSD image combining method in the typical projection mode, that is, in a case where the additional lens 70 is not placed in the projection system 66. When the projection mode is the typical projection mode, the typical OSD image 105A is generated based on the typical OSD data 54 stored in the storage section 52. The typical OSD data 54 may be image data representing the typical OSD image 105A or may have a configuration in which bitmap data that defines a UI screen in a menu format or text data that defines menu contents is put in the storage section. The OSD processor 24 generates image data on an OSD combined image 110A in which the typical OSD image 105A is superimposed in a predetermined positon on a content image 100 represented by the input image data.

Therefore, for example, when the content image 100 has an aspect ratio of 16:9 and the light modulator 64 has a drawing area having the aspect ratio of 16:9, the projection unit 60 projects the OSD combined image 110A on the screen SC without expansion or reduction of the OSD combined image 110A in the rightward/leftward direction or the upward/downward direction. As a result, a viewer can view a picture image that is roughly the same as the OSD combined image 110A on the screen SC.

Figure 3:
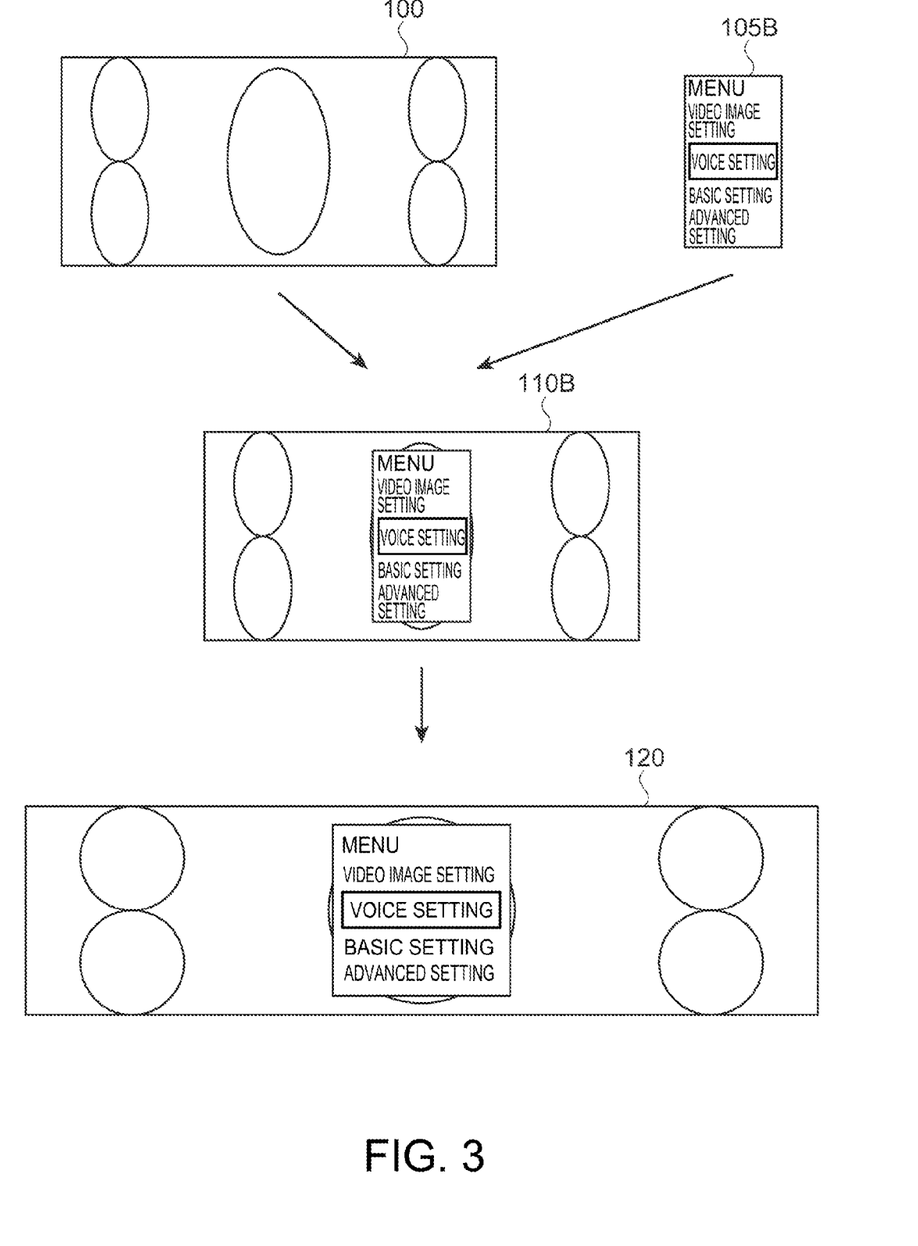
FIG. 3 shows an OSD image combining method in a case where an additional lens is placed in the projection system.

FIG. 3 shows an OSD image combining method in the expanded projection mode, that is, in a case where the additional lens 70 is placed in the projection system 66. In this case, the content image 100 may have a configuration in which the content image has, when inputted, the aspect ratio corresponding to the cinemascope size and the resolution of the content image in the upward/downward direction is converted by the image processor 22.

When the projection mode is the expanded projection mode, the reduced OSD image 105B is generated based on the reduced OSD data 56 stored in the storage section 52. The reduced OSD data 56 may be image data representing the reduced OSD image 105B or may have a configuration in which bitmap data that defines a UI screen or text data that defines menu choices is put in the storage section.

In the present embodiment, since the additional lens 70 is assumed to be an anamorphic lens, the reduced OSD data 56 has a configuration in which the typical OSD image 105A is so deformed in a predetermined direction (reduced in horizontal direction in this case) that a picture image similar to the typical OSD image 105A is projected when the effect of the anamorphic lens changes the aspect ratio of the projected image.

The OSD processor 24 generates image data on an OSD combined image 110B in which the reduced OSD image 105B is superimposed in a predetermined position on the content image 100 represented by input image data.

The projection unit 60 produces image light representing the OSD combined image 110B and outputs the produced image light out of the projection system 66. The outputted image light passes through the anamorphic lens, which changes the aspect ratio of the OSD combined image 110B to the aspect ratio corresponding to the cinemascope size, and the resultant image light is projected on the screen SC. The viewer views an image 120 having the changed aspect ratio on the screen SC. As a result, the viewer can view an OSD image picture in the picture image 120 as satisfactorily as the viewer views the typical OSD image 105A. Further, in a projection area where the projection system 66 can perform projection, since the area of an OSD image picture is not widened, the viewer does not sense degradation in visibility of moving images.

In the present embodiment, the reduced OSD data 56 is determined in correspondence with the characteristic of a single anamorphic lens, but the reduced OSD data 56 is not necessarily determined as described above. For example, when the user selects one of a plurality of types of additional lens 70 and places the selected additional lens 70 in the projection system 66, the placement detector 58 acquires identification information that identifies the additional lens 70 placed in the projection system 66 and sends the identification information along with the placement signal to the OSD mode determination section 42. The OSD mode determination section 42 may select one OSD data corresponding to the identification information from a plurality of sets of OSD data stored in the storage section 52, and the OSD image generation section 44 may generate an OSD image based on the selected OSD data.

It is noted that OSD data corresponding to the additional lens 70 is not necessarily reduced but may be expanded. A configuration in which OSD data is reduced in one direction but expanded in the other direction may further be assumed.

Further, the OSD mode determination section 42 may generate an OSD image according to the optical characteristic of the additional lens 70 based on the identification information without referring to the OSD data in the storage section 52.

Figure 4:
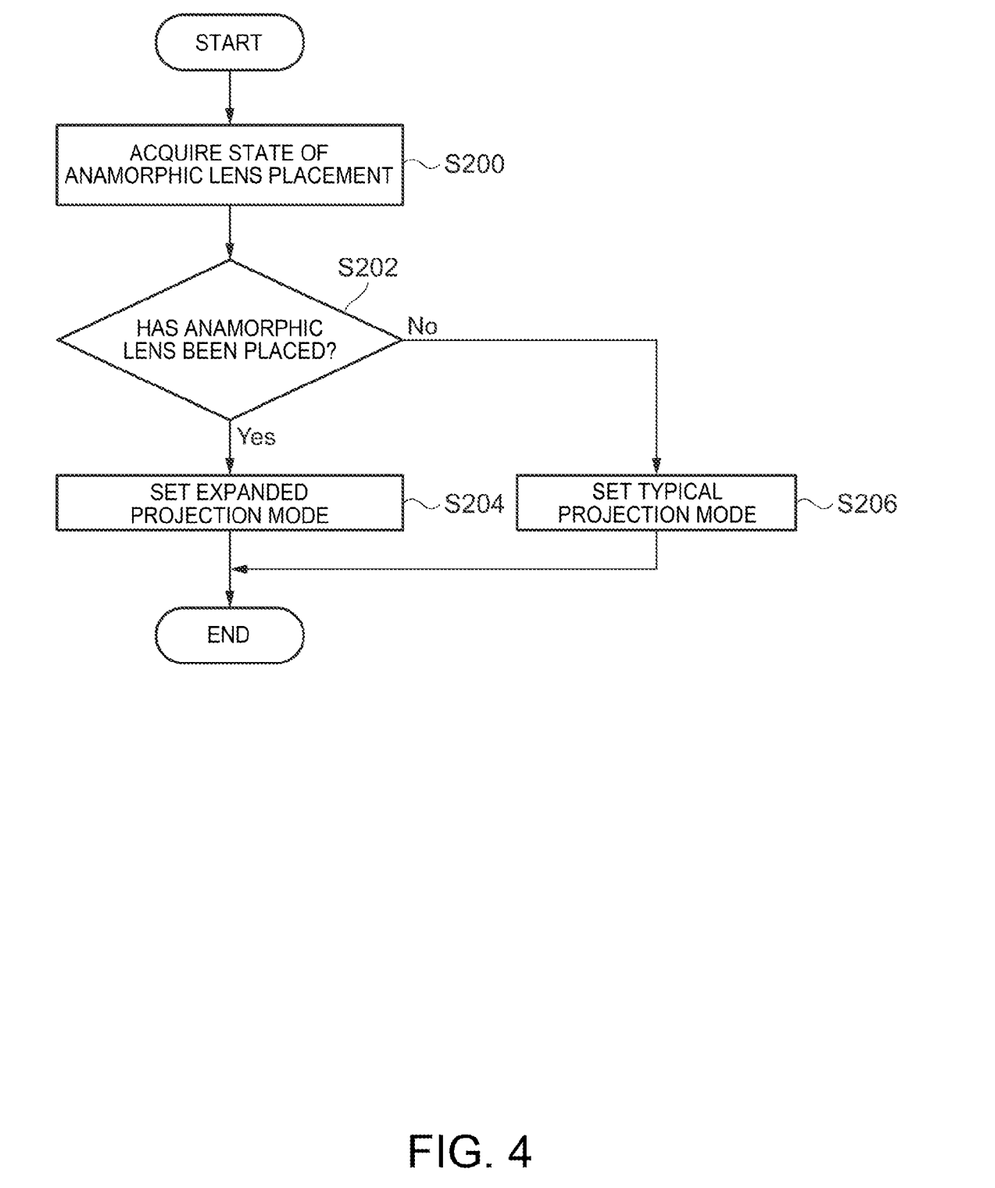
FIG. 4 is a flowchart showing the procedure of processes of determining a projection mode.

FIG. 4 is a flowchart showing the procedure of processes of determining the projection mode of the projector 10.

When the processes are initiated, the control unit 30 acquires the state of placement of the anamorphic lens in the projection system 66 (step S200).

The control unit 30 then evaluates the state of placement of the anamorphic lens (step S202). When a result of the evaluation shows that the anamorphic lens has been placed in the projection system 66 (Yes in step S202), the control unit 30 sets the projection mode to be the expanded projection mode (step S204) and terminates the processes.

On the other hand, when a result of the evaluation shows that the anamorphic lens has not been placed in the projection system 66 (No in step S202), the control unit 30 sets the projection mode to be the typical projection mode (step S206) and terminates the processes.

Figure 5:
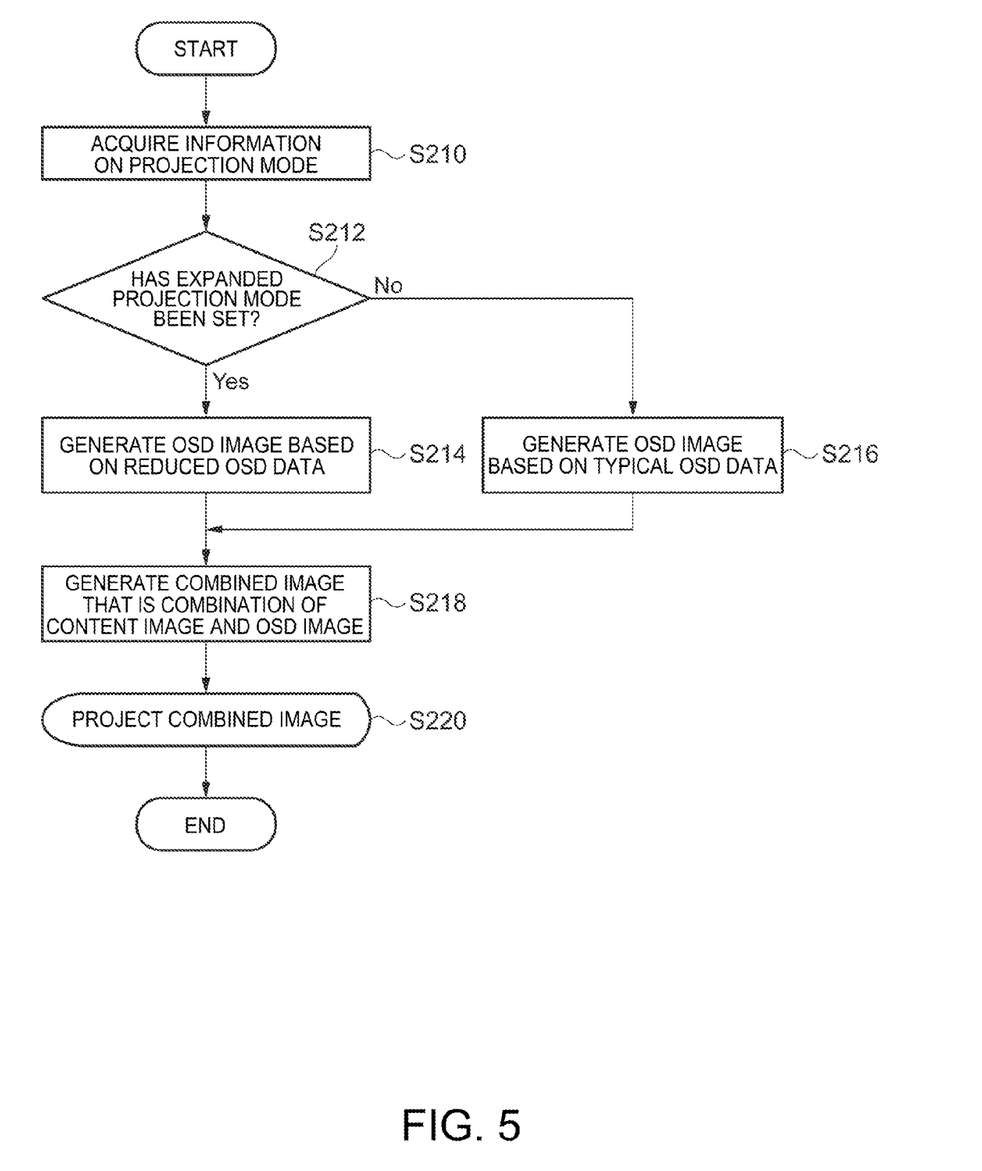
FIG. 5 is a flowchart showing the procedure of an OSD process of projecting an OSD image.

FIG. 5 is a flowchart showing the procedure of an OSD process of projecting an OSD image from the projector 10.

When the processes are initiated, the control unit 30 acquires information on the projection mode (step S210).

The control unit 30 then evaluates whether or not the acquired projection mode has been set to the expanded projection mode (step S212).

When a result of the evaluation shows that the expanded projection mode has been set (Yes in step S212), the control unit 30 generates the reduced OSD image 105B based on the reduced OSD data 56 (step S214) and proceeds to step S218.

On the other hand, when a result of the evaluation shows that the expanded projection mode has not been set, that is, the typical projection mode has been set (No in step S212), the control unit 30 generates the typical OSD image 105A based on the typical OSD data 54 (step S216) and proceeds to step S218.

In step S218, the control unit 30 generates a combined image that is a combination of the content image 100 and the OSD image (step S218), projects the generated combined image on the screen SC (step S220), and terminates the processes.

When an instruction to project an OSD image is issued, the control unit 30 is configured to repeat the processes shown in FIGS. 4 and 5 at predetermined time intervals. Therefore, when the anamorphic lens is placed or removed during projection of one of the OSD images described above, the control unit 30 can immediately switch the one OSD image to the other OSD image.

According to the embodiment described above, the following advantageous effects are provided.

(1) When the content image 100 expanded in the horizontal direction by the anamorphic lens is projected, an OSD image picture in the picture image 120 on the screen SC is viewed as if it were the typical OSD image 105A, whereby degradation in visibility of the OSD image picture due to the change in the aspect ratio can be avoided. Further, since the reduced OSD image 105B is an image reduced in the horizontal direction in advance, degradation in visibility of the content image 100 in a case where an OSD image picture expanded in the horizontal direction occupies a large part of the projection area can also be avoided.

(2) Since the reduced OSD image 105B is generated based on the reduced OSD data 56 stored in the storage section 52, no image reduction operation based on the typical OSD data 54 is required, whereby degradation in image quality of an OSD image picture can be avoided.

The embodiment of the invention has been described with reference to the drawings, but the specific configuration is not limited to the configuration in the embodiment, and design changes and modifications to the extent that they do not depart from the substance of the invention fall within the scope of the invention. Further, the approach described above is performed by a single apparatus in some cases and by a combination of a plurality of apparatus in other cases, that is, an apparatus that achieves the approach have a variety of configurations.

Each of the configurations and combinations thereof in the embodiment described above are presented by way of examples, and addition of a configuration, and omission, substitution, and other changes of any of the configurations described above can be made to the extent that the changes do not depart from the substance of the invention. Further, the invention is not limited by the embodiments but is limited only by the appended claims.

What is claimed is:

1. A projector comprising:
    a generation section that generates an OSD image;
    a combining section that generates a combined image in which the OSD image is superimposed on an input image;
    a light source section that outputs a light flux;
    a modulation section that modulates the light flux in accordance with the combined image to produce image light;
    a projection section that projects the image light; and
    a detection section that detects whether an optical member that changes an aspect ratio of the image light has been inserted into an optical path of the projection section,
    wherein
        when the detection section detects that the optical member has not been inserted, the generation section generates the OSD image to have a first OSD aspect ratio, and
        when the detection section detects that the optical member has been inserted, the generation section generates the OSD image to have a second OSD aspect ratio different from the first aspect ratio.

2. The projector according to claim 1, further comprising a storage section that stores OSD data on the OSD image,
    wherein the generation section generates the OSD image based on the OSD data stored in the storage section.

3. The projector according to claim 1,
    wherein when the detection section does not detect the insertion of the optical member, the generation section generates a first OSD image, whereas when the detection section detects the insertion of the optical member, the generation section deforms the first OSD image in accordance with an optical characteristic of the optical member to generate a second OSD image.

4. The projector according to claim 1,
    wherein the generation section generates the second OSD image by expanding or reducing the first OSD image in a predetermined direction.

5. The projector according to claim 1,
    wherein the optical member is inserted into a portion on one side of the projection section on which the image light is incident, into a portion on the other side of the projection section where the image light exits, or into the projection section.

6. The projector according to claim 3,
    wherein the optical member is an anamorphic lens, and the generation section generates the second OSD image by reducing the first OSD image in a direction in which the image light is expanded by the anamorphic lens.

7. The projector according to claim 1, wherein
    when the optical member is not inserted into the optical path, the image light has a first aspect ratio,
    when the optical member is inserted into the optical path, the image light has a second aspect ratio larger than the first aspect ratio, and
    the second OSD aspect ratio is smaller than the first OSD aspect ratio.

* * * * *